United States Patent [19]
Biggs et al.

[11] Patent Number: 5,308,936
[45] Date of Patent: May 3, 1994

[54] ULTRASONIC PEN-TYPE DATA INPUT DEVICE

[75] Inventors: Michael P. Biggs, Westlake Village; Takeo Z. O'Ishi, Los Angeles, both of Calif.; Mark S. Knighton, 1920 La Mesa Dr., Santa Monica, Calif. 90402

[73] Assignee: Mark S. Knighton, Santa Monica, Calif.

[21] Appl. No.: 935,838

[22] Filed: Aug. 26, 1992

[51] Int. Cl.⁵ .............................................. G08C 21/00
[52] U.S. Cl. ....................... 178/18; 178/19; 382/3
[58] Field of Search ............ 178/18, 19; 340/706, 340/712; 382/3

[56] References Cited

U.S. PATENT DOCUMENTS

| | | | |
|---|---|---|---|
| 4,357,672 | 11/1982 | Howells et al. | 364/561 |
| 4,800,240 | 1/1989 | Béchet | 178/18 |
| 4,814,552 | 3/1989 | Stefik et al. | 178/18 |
| 4,827,410 | 5/1989 | Corren | 364/200 |
| 4,832,144 | 5/1989 | Murakami et al. | 178/18 |
| 4,845,684 | 7/1989 | Garwin et al. | 178/18 X |
| 4,891,474 | 1/1990 | Kelly | 178/18 |
| 5,043,950 | 8/1991 | Schorum et al. | 367/98 |

Primary Examiner—Stephen Chin
Assistant Examiner—Paul Coombs
Attorney, Agent, or Firm—Blakely, Sokoloff, Taylor & Zafman

[57] ABSTRACT

A computer data input device is provided which is characterized by a wireless pen for moving over the surface of a tablet. The pen will simultaneously emit magnetic pulses and ultrasonic pulses. The tablet will be equipped with a magnetic detection coil and two microphones. The magnetic detection coil will nearly instantaneously detect the magnetic pulse and serve as a time reference for determining the time it takes to detect the ultrasonic pulses. The detection circuitry will detect a specific point within the ultrasonic pulse and the time travel of the sonic pulse to the two microphones will be used to determine the distance of the pen from the two microphones yielding the position of the pen over the surface of the tablet.

51 Claims, 10 Drawing Sheets

TETHERED

NI-CAD RECHARGEABLE

STANDARD DISPOSABLE AAA

ULTRASONIC PEN-TYPE DATA INPUT DEVICE

BACKGROUND OF THE INVENTION

1. Field of the Invention

The present invention relates to computer data input devices, and more particularly, to a stylus pointer for indicating positions over a detection tablet surface which can be coupled to a computer for inputting data represented by the position or movement of the stylus.

2. Art Background

As the computer revolution has progressed, the familiar form of the machine and the man-machine interface has continued to evolve. Where once punch cards and tape readers, having to be shared by many users, were the dominant interface, today the keyboard interface has become pervasive. The common scheme of a box and keyboard has today become inadequate for many situations. As the drums of time continue beating, the ubiquitous keyboard has reached its limitations.

The advent of advanced semiconductor technologies has resulted in computers becoming smaller and easily transportable. Today, portable laptop computers which utilize small keyboards are nearly as common as desktop computers were just a few years ago. The next step in the downsizing revolution is now upon us. Handheld computers have become so small that the standard keyboard interface is no longer practical or, in many cases, even necessary. The greater computing power of the new machines provides an opportunity for programs and even operating systems to be capable of interpreting written symbols. These small machines are usually provided with flat screens composed of liquid crystal display elements. The flat displays provide an obvious writing tablet-type surface. The logical complement to this is an electronic pen with which to convey inputs to the computers. Even with conventional desktop computers, it is frequently desirable to have the use of a pen-type input.

Tablet and stylus input devices themselves are not new. U.S. Pat. No. 3,838,212 discloses a pen-style input device. The pen is connected to the rest of the hardware by a wire or tether down which a trigger pulse is sent. The trigger pulse causes the pen device to generate a spark gap which creates a shock wave. The leading edge of the shock wave is detected by microphones mounted around the detecting area. The trigger signal is also used as a timing reference for determining the time of travel of the shock wave. The drawbacks of this system are that the wire is required so that the same trigger signal may be used for igniting the spark gap and timing the wave front travel. Another significant disadvantage to such a system is that a spark gap creates audible noise which can be annoying to people in the vicinity. Two such devices near each other may easily interfere. Further, by detecting only the leading edge of the sound wave, the device is likely to be severely susceptible to other extraneous noises.

Other prior art systems suffer many limitations; they are not always accurate, they may have to be connected by a wire, and they may be extremely susceptible to external noises or vibrations. Thus, it would be desirable to provide a stylus and tablet-type interface for computers in which a wireless pen may be used, is accurate and does not suffer from excess external noise and vibration problems.

SUMMARY OF THE INVENTION

It is an Object of the present invention to provide a data input device for computers as an alternative to the standard keyboard-type interface.

It is also an object of the present invention to provide a data input device for computers which is as convenient to use as writing on paper with a pen.

It is a further object of the present invention to provide a stylus-and-pad-type interface where the pen need not be electrically connected by a wire to the tablet.

It is still another object of the present invention to provide a stylus-and-tablet-type interface which is not extremely susceptible to external noises and vibrations.

It is also an object of the present invention to provide a stylus-and-tablet-type interface that is reliably accurate so that stylus positions may be accurately interpreted by interpreting hardware associated therewith.

It is yet another object of the present invention to provide an interface suitable for use with handheld computers that are lightweight and inconvenient for use with a standard keyboard.

These and other objects of the present invention are realized in a data input device utilizing an active wireless stylus, a tablet equipped with microphones and a magnetic detection coil. When the stylus is in contact with the tablet, it emits sonic and magnetic pulses periodically. The magnetic pulse is detected almost instantaneously and is used as a reference for determining the travel times of the sonic pulse from the stylus to the two microphones. The microphone detection circuitry is designed to respond only to a specific point in a waveform that corresponds to the sonic pulse emitted by the stylus. Knowing the travel times to the two microphones directly translates into the distance of the stylus from both of the microphones. This allows for the position of the stylus to be accurately calculated at all times thereby providing a means of inputting handwritten symbols or indicating positions into the computer.

The objects, features and advantages of the present invention will be apparent from the following detailed description in which.

Figure 9A:
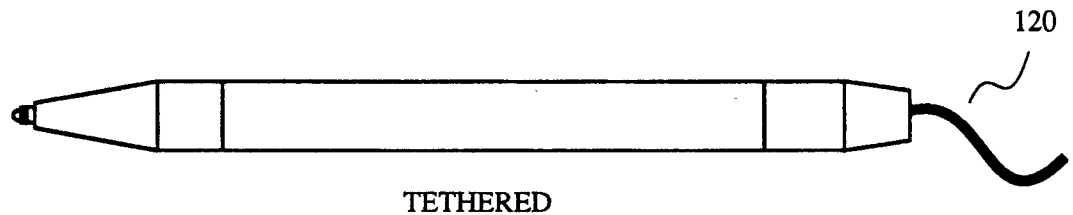
Figure 9B:
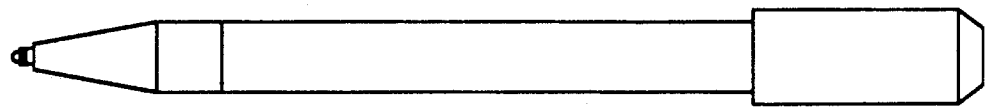
Figure 9C:
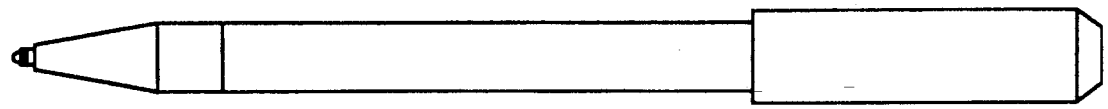

FIGS. 9(a), 9(b) and 9(c) indicate alternative embodiments of the present invention utilizing different power sources.

Figure 10:
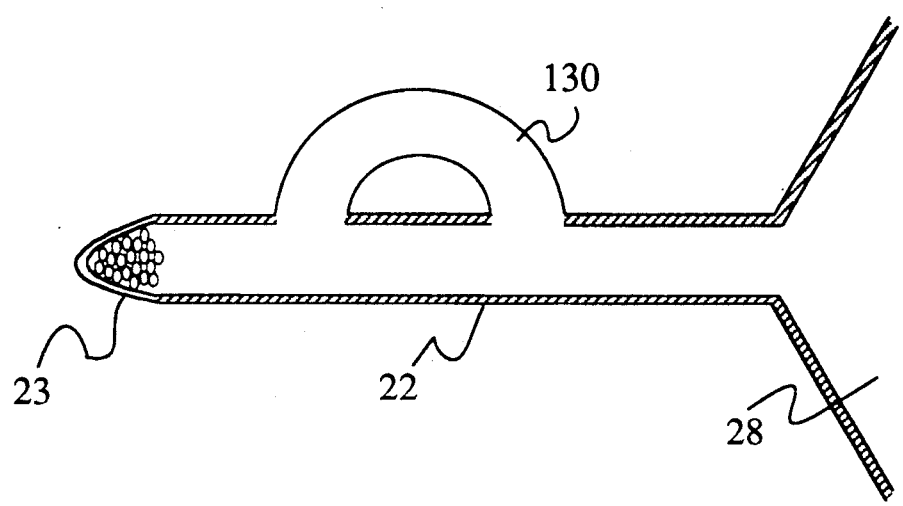

FIG. 10 illustrates an alternative embodiment of the present invention for further dampening any acoustic noise created by the present invention.

DETAILED DESCRIPTION OF THE INVENTION

A method and apparatus are described for using ultrasonic location for indicating positions on a computer tablet. In the following detailed description, numerous specific details are set forth such as some specific computer components, etc., in order to provide a thorough understanding of the present invention. It will be apparent, however, to one skilled in the art that the present invention may be practiced without such specific details. In other instances, well-known components, structures and techniques have not been shown in detail to avoid unnecessary obscuring the subject matter of the present invention.

THE OVERALL ULTRASONIC DIGITIZER SYSTEM

Figure 1:
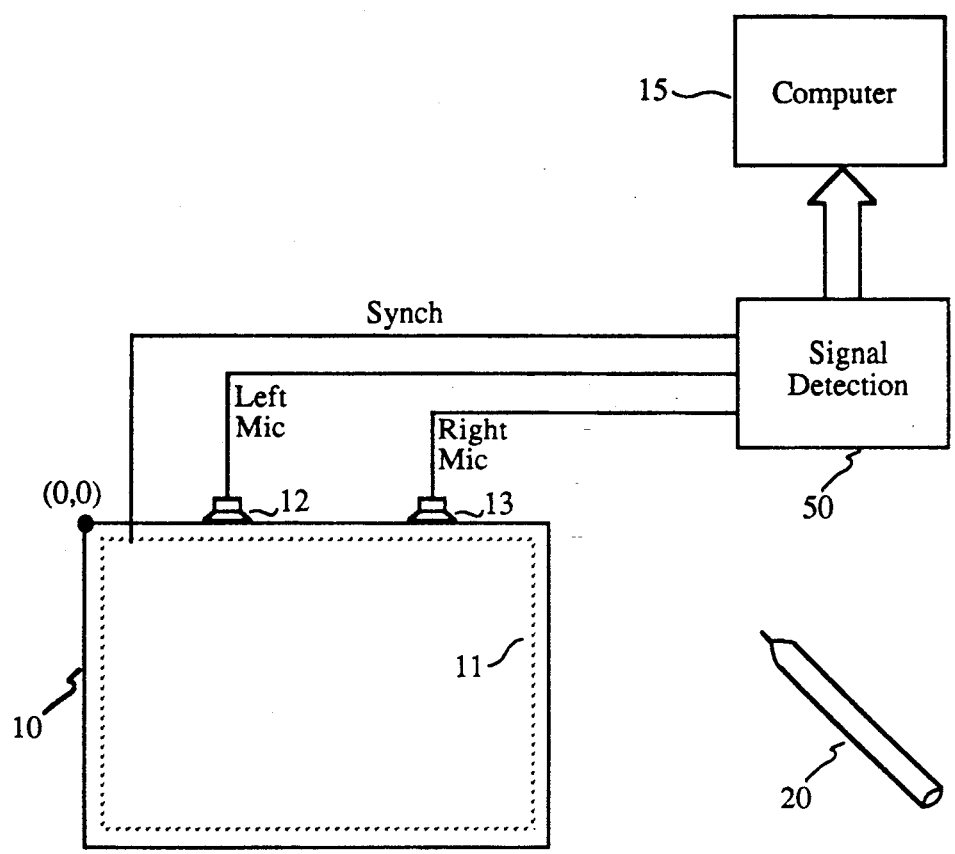
FIG. 1 shows a data input tablet equipped with the detecting elements of the present invention.

Referring first to FIG. 1, the overall data input device in accordance with a preferred embodiment of the present invention is shown. The major components of the input device are the tablet 10, stylus pen 20 and the tablet detection circuitry 50. The data input apparatus of FIG. 1 is shown coupled to an external computer 15. However, the present invention in its preferred embodiment is implemented in a handheld device where the tablet detection circuitry 50 is housed in the same casing upon which the tablet 10 is a facing surface. In some embodiments, the computer 15 may also be incorporated in the same housing to form a self-contained "pen-computer". The tablet 10 in accordance with a preferred embodiment of the present invention comprises a plastic surface which overlays an LCD display for the data input device.

The stylus pen 20 shown in FIG. 1 is detached and free from the remaining apparatus. It is a wireless stylus and is used for either "writing" symbols or pointing to selections over the surface of the tablet 10. The stylus pen of the present invention emits both sonic and magnetic pulses which are detected at the boundary of the surface of the tablet for determining the position of the stylus. Under the tablet surface 10, on the printed circuit board which holds the detection circuitry for the present invention, a magnetic detection coil 11 is etched to circumscribe the board's perimeter. Magnetic pulses from the stylus pen are detected by the magnetic detection coil 11 almost instantaneously upon triggering because magnetic waves propagate at a significant fraction of the speed of light.

Embedded in the casing of the tablet 10 and on one edge of the tablet's surface are two microphones 12 and 13. These are electret microphones and are selected to be especially responsive in the frequency range of the sonic pulses generated by the stylus pen 20. The signals from the magnetic detection coil 11 and the microphones 12 and 13 are processed by the tablet detection circuitry 50.

In a preferred embodiment of the present invention, the stylus pen 20 emits magnetic pulses and ultrasonic pulses simultaneously 100 times per second. The magnetic pulses are almost instantaneously detected by the magnetic detection coil 11 and that signal is propagated to the tablet detection circuitry 50. Thereafter, the ultrasonic signal of a given cycle is detected by the microphones 12 and 13. The time delay between the detection of the magnetic signal and the detection of the sonic signal at the two microphones indicates the time of travel of the ultrasonic signal from the stylus pen 20 to the left microphone 12 and to the right microphone 13. Knowing the speed of sound for the ambient environment in which the system is being used, it is readily determinable what the distance is from the stylus pen 20 to each of the microphones. The distance of the stylus from both microphones corresponds to a single position over the surface of the tablet 10. Therefore, the use of a magnetic synchronization signal in combination with an ultrasonic location detection signal enables accurate determination of the positions of a moving stylus, at a rate of 100 positions per second in accordance with a preferred embodiment of the present invention. The position sampling of 100 times per second is arbitrary and may be varied in accordance with a specific application. Position detection every 10 msec (100 Hz) has been found to be adequate for detecting "writing" without overburdening the detection and processing circuitry.

THE ULTRASONIC STYLUS

Figure 2:
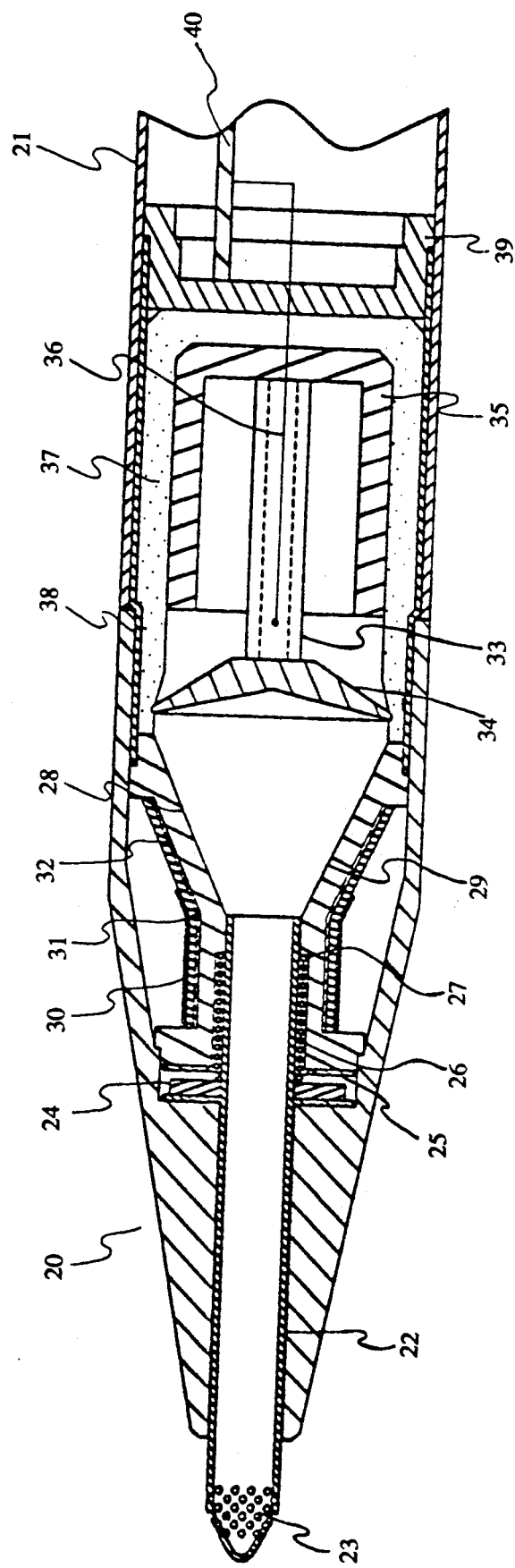
FIG. 2 illustrates an expanded and transparent view of a portion of the stylus pen which emits the location signals.

Referring next to FIG. 2, an expanded and transparent view of a portion of the stylus pen 20 is shown. Embedded in the stylus pen 20 is the ultrasonic signal assembly as well as the magnetic pulse generation assembly. The stylus pen 20 is surrounded by a barrel 21 and has a tip 22 much like an ordinary writing pen. The pen tip 22 in the present invention serves as a sound pipe for directing acoustic waves, the ultrasonic signals, out of the stylus pen 20. The acoustic waves propagate from the stylus to the atmosphere through apertures 23 close to the end of pen tip 22 which serve to spread the signal in the plane of the writing surface. The closer the apertures 23 are to the end of pen tip 22 the better, because errors due to pen tilting will have less of an effect. For acoustic purposes, it has been determined that for the best acoustic wave output from the pen tip, the combined total surface area of the apertures 23 should equal the cross-sectional area of the pen tip 22.

In operation, the pen is activated by depressing it upon the surface of the detection tablet. When this happens the pen tip 22 recesses slightly into the barrel 21 of the stylus. When depressed, a conductive rubber switch 24 is brought into contact with flexible contact 25 which closes a circuit through unshown wires thereby turning on the device. The force required on the tip to activate the switch is controlled by a spring 26 which pushes against a lip 27 of the cone plug 29. It has been found that for the most realistic "writing" feel, the spring should exert about 10 grams of force against the tip and recess approximately 12/1000 of an inch when depressed.

The acoustic waves which are propagated down the pen tip 22 pass through a cone 28. The cone is defined in the structure by cone plug 29. It is the cone plug 29 which also defines the lip against which the spring 26 is secured. The cone plug 29 serves three purposes. First, the cone plug supports the switching mechanism as described. Second, the cone plug serves as a bobbin around which a coil 30 is wound. The coil 30 is the mechanism by which magnetic pulses are generated. By having the coil 30 around the cone plug 29, the coil is allowed to be close to the digitizer surface which will maximize the amplitude of the magnetic pulse as seen by the receiving coil. Embedded between the coil and the cone plug 29 is a material known as a MU-metal shield 31 which serves to amplify the magnitude of the magnetic pulse generated. The MU-metal shield 31 may be secured to the cone plug 29 by double-stick tape 32 which also helps secure the coil 30. In the preferred embodiment stylus pen, it has been found that 30 turns of 34 gauge wire wound over a thin layer (0.002") of Co-netic AA foil yields a suitable magnetic pulse. The third purpose served by the cone plug 29 is that it defines the cone 28 which provides acoustical impedance matching to the pen tip for the ultrasonic pulses.

The following portion describes the ultrasonic transducer assembly incorporated in the stylus pen 20 in accordance with a preferred embodiment of the present invention. The heart of the ultrasonic transducer assembly is a ceramic piezo stack 33. This is a piezo stack in which many layers of piezo ceramic are laminated together. Although the displacement of a single layer is small, the layers are electrically connected such that their displacements add, so the stack gives a larger displacement for a given voltage than a solid material would. Such a piezo stack is commercially available and in the present invention the Tokin NLA-1.4×3×9 device is utilized. The piezo stack 33 is electrically coupled to the power supply through wires 36 which couple to the circuit board 40 of the stylus pen 20.

The piezo stack 33 is coupled to an aluminum diaphragm 34. The diaphragm 34 is attached to the end of the piezo stack closest to the pen tip. The stack acts as a rigid solid, allowing for a large forces to be applied rapidly, in this case to the diaphragm thereby generating the ultrasonic pulses. Coupled to the other end of the piezo stack 33 is a reaction mass 35. The reaction mass 35 in the preferred embodiment is a brass disk weighing considerably more than the diaphragm 34. With the reaction mass present, the bulk of the piezo displacement is transferred to the diaphragm thus creating a larger ultrasonic pulse. This assembly for creating ultrasonic pulses is characterized in that the pulses that are generated have a waveform with a large initial pulse. As described, the diaphragm 34 faces the cone 28 which then impedance matches the acoustic wave from the cone diameter down to the diameter of the sound pipe in the pen tip 22. The ultrasonic transducer assembly is surrounded by sound absorption material 37 which can be silicone rubber or other sound suppressing foam. It is important to isolate the front area of the diaphragm from the back so that there is no front-to-back canceling of the ultrasonic wave in the apparatus. Further, the sound absorption material 37 acts as a cushion for the assembly.

The ultrasonic transducer assembly is supported in the barrel of the stylus by a transducer mount 38. The transducer mount is sealed in place in the assembly by the transducer mount stop 39 which keeps the entire assembly from being pushed back when the pen is depressed. The transducer mount stop 39 also serves as a mount for one end of the printed circuit board 40 which houses the pen driving circuitry.

STYLUS SIGNAL CIRCUITRY

Figure 3:
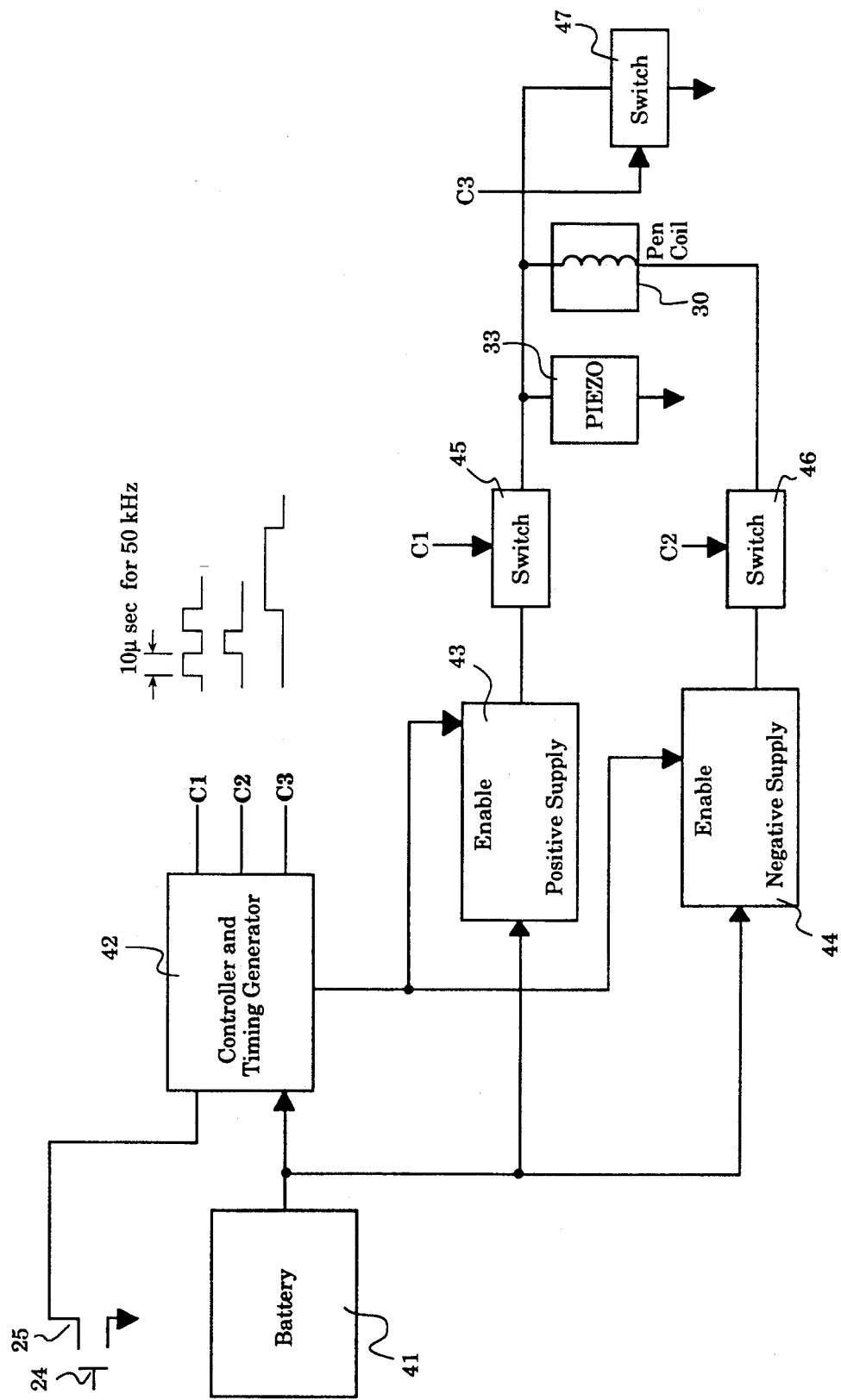
FIG. 3 illustrates a block diagram of the control circuitry for the signal emission portion of the stylus pen.

Referring now to FIG. 3, the block circuit diagram for the pen circuitry which triggers the ultrasonic and magnetic pulses is shown. The circuit is powered by a battery 41 which, as will be described further herein with respect to FIG. 9, may be any number of different types of batteries. The battery is electrically coupled to the controller and timing generator 42 which is responsible for triggering the various portions of the stylus circuitry. The timing and control circuitry may be a discrete timer or a microcontroller or other timing device. The controller and timing generator is activated by the switch 25 and flexible contact 26 as described with respect to the mechanical portion of the pen in FIG. 2.

In the preferred embodiment of the present invention, the battery 41 is used to provide voltage to two different power supplies, a positive power supply 43 and a negative power supply 44. This is done as a technique for driving the piezo stack so as to minimize the audibility of the sonic pulses. The piezo stack is driven first with a positive voltage of 6 volts, then with a negative voltage of 1½ to 2 times the amplitude of the positive voltage, −9 to −12 volts, followed by a positive voltage with equal amplitude to the first positive voltage. These voltages can be scaled for different amplitudes, maintaining the relative amplitudes of the positive and negative drive signals. It turns out that the human ear is less responsive to this ramping approach than if a sudden high voltage were applied to the ultrasonic generator. The controller and timing generator 42 emits control signals to a switch 45 for first driving the positive voltage and then a signal is sent to the switch 46 for supplying the negative voltage followed by a signal to the switch 45 again supplying the positive voltage. The pen coil is coupled from the piezo stack to the negative supply through the switch 46 so that both sonic and magnetic signals are generated when switch 46 is closed. When the controller 42 closes switch 47, any voltage on the piezo stack 33 is discharged and the ultrasonic vibrations are dampened.

The magnetic synchronization signal need not be limited to a single pulse. The timing and control generator can be used to generate encoded magnetic pulses conveying other information to the processing circuitry. Such signals may be used for identifying a mode in which the stylus is being used or for identifying which stylus is being used.

An alternative technique for driving the piezo stack 33 is to charge it to a high voltage, approximately 30 volts, and then rapidly discharge it through the magnetic pulse coil 30. The result is a guarantee that the magnetic pulse and sonic pulse will be generated simultaneously. Further, the use of the charged piezo as a power source for driving the coil reduces the power consumption of the overall device.

TABLET DETECTION CIRCUITRY

Figure 4:
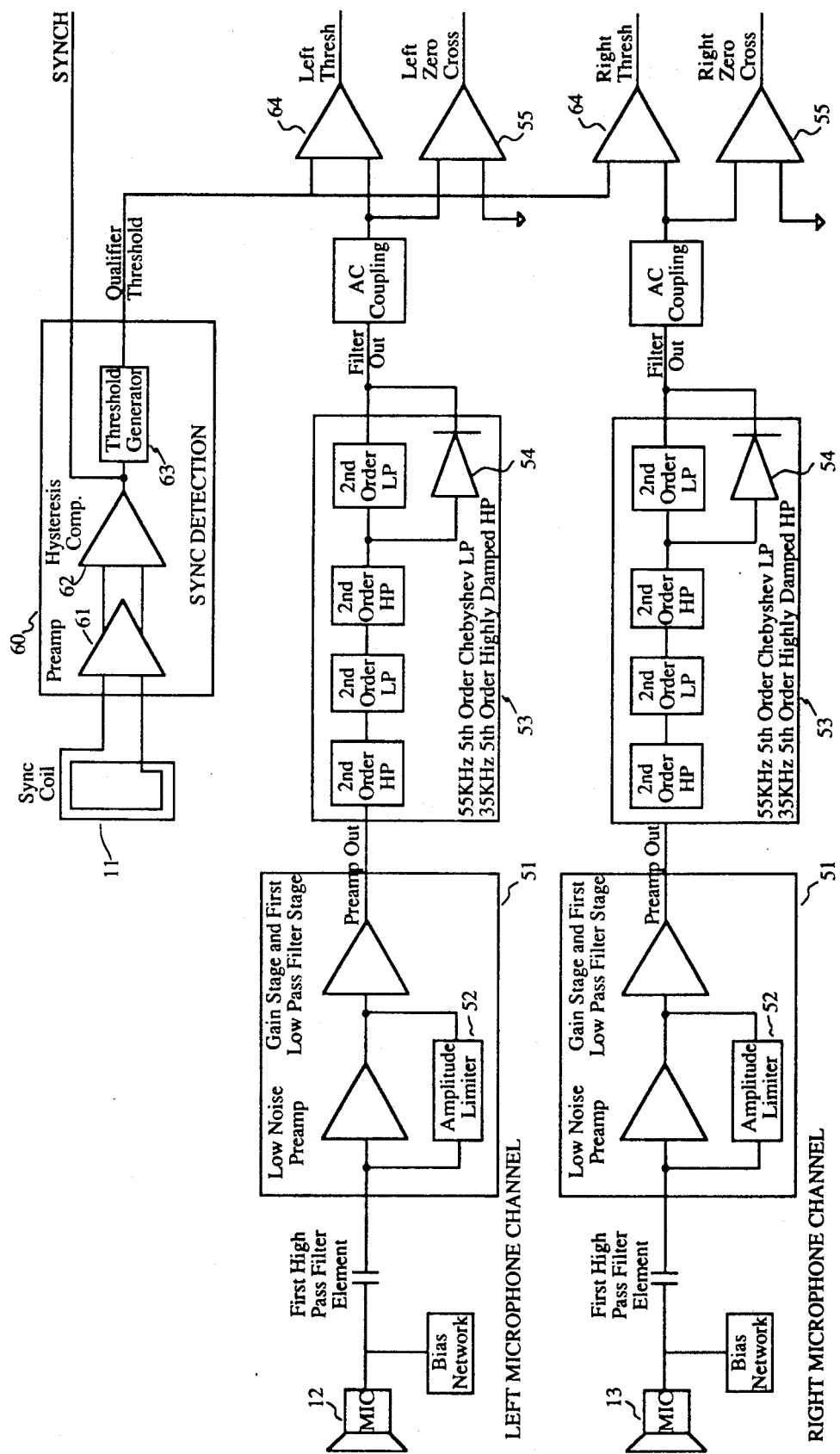
FIG. 4 is a block diagram representative of the circuitry of the present invention for detecting the synchronization and acoustic signals generated by the stylus pen in accordance with a preferred embodiment of the present invention.

Referring now to FIG. 4, a block diagram of the tablet detection circuitry 50 is shown. FIG. 4 shows the ultrasonic pulse detection microphones 12 and 13 as well as the magnetic pulse detection coil 11 which is etched around the border of the printed circuit board under the surface of the tablet 10. The ultrasonic pulses detected by the microphones 12 and 13 are processed by amplifying circuitry 51 and filtering circuitry 53. The microphones 12 and 13 are each coupled to the preamp stage 51 which provides high gain and low noise. The signal detected by each microphone is AC-coupled to the preamp 51 to prevent audible noise from overloading the preamp. The amplitude is limited by diodes 52 in the feedback network to prevent saturation of the preamp or later filter stages which would cause distortion and affect the time measurements of the stylus output pulses.

After the sonic signal has been processed in the preamp stage 51, it is propagated to the filtering stage 53. In the preferred embodiment, the filter stage 53 comprises a fifth-order Chebyshev low pass filter and a fifth-order highly damped high pass filter. The preferred embodiment high pass filter rejects all noise below 30 KHz, the bulk of which is audible noise falling below 10 KHz. The low pass filter portion rejects all ultrasonic or electrical disturbances above the frequency of 60 KHz in the preferred embodiment. The ultrasonic transducer assembly of FIG. 2 is designed for emission of ultrasonic signals near the center of the detection range.

In addition to noise rejection, the filters must be chosen considering the effect they have on the processed signals. Since the relevant portion of the ultrasonic signal is a single cycle of a sine wave, the transient response of the filter to a single pulse is vitally important. Specifically, the filter must not exhibit significant preshoot, that is aberrations arriving before the signals, and the first impulse should not be significantly attenuated. The final stage of the filter stage 53 includes a diode 54 to prevent the negative-going portion of the signal from saturating the filter and distorting the desired positive-going signal. This provides for a greater signal range to be utilized for the positive-going signal.

In order to accurately measure the travel time of the ultrasonic signal, it is necessary to precisely select the desired point on the waveform while screening out impulses due to noise. A distinctive point on the waveform to identify is the first zero-crossing after the high first pulse. This is also the point of maximum slope, which reduces the effects of noise on the measured position. Detecting the chosen point in the waveform is carried out by a zero-crossing detector 55. In order to screen out noise induced zero-crossings from the desired signal, a threshold qualifier is added. Only a pulse larger than a threshold, specifically the stylus output ultrasonic signal, will enable the zero-crossing detector. Of course, the present invention is not limited to detecting only the first zero-crossing after the first threshold peak. Those skilled in the art will envision situations where it is necessary to detect for the case where multiple cycles have been above the threshold, not necessarily just the first. Also, it might be desirable to look for subsequent zero-crossings to the first one, which may be useful in some circumstances.

The magnetic pulse from the stylus 20 is detected by the magnetic detection coil 11 that is etched around the border of the circuit board under the tablet 10. The magnetic signal is processed by a synchronization signal processing portion 60. The coil signal passes through differential amplifier 61 to a differential comparator 62 with a threshold set by hysteresis. The synchronization signal generated by the comparator then triggers the decreasing qualifying threshold. Standard amplifiers may be used but should be chosen so that the total input resistance and capacitance will act with the magnetic detection coil inductance to form a filter and reject noise from external sources as well as from the circuitry encountered on the printed circuit board. In the preferred embodiment implementation, the central frequency of this filter is 500 KHz. The synchronization signal is also provided as an output to be used as a timing reference signal to indicate a time lapse starting point for sonic signal timing.

The amplitude of the received sonic signal drops as it moves away from the microphones, specifically its level is inversely proportional to time or distance. By adjusting the qualifying threshold for different points in time, maximum resistance to noise can be achieved when the stylus is close to the microphone and the signal is large, while at greater distances, the reduced threshold allows a smaller sonic signal to meet the threshold qualification requirement. The relationship between amplitude and time has been approximated with an exponentially decaying threshold with a fixed minimum level. The exponential decay starts when the magnetic synchronization pulse is detected. Therefore, the threshold generator 63 provides for a lower threshold signal the longer the time from the detection of the magnetic synchronization signal to the detection of the ultrasonic location signal. Detected signals meeting threshold requirements at threshold detectors 64 are then provided as outputs for indicating the detection of a sonic pulse.

The detection circuitry may further include a thermometer for determining the ambient temperature. This information can also be supplied to processing circuitry which can use it for determining the speed of sound in the local environment.

The stylus and tablet circuitry of the present invention may be used in combination with many sorts of hardware or software driven technologies which can calculate the time difference between the output synchronization signal and the detection of the desired point in the ultrasonic signals which thereby yields distances and therefore, a position of the stylus 20 over the tablet 10. The system needs to be able to use the synchronization signal to initialize a timing operation. Then, when each microphone receives a signal that meets the above-described threshold requirements, the timing for that signal is stopped. The amount of time from the synchronization signal to the zero-crossing following the above-threshold sonic signal is the time of travel of the sonic signals. Multiplying the times of travel to the two microphones by the speed of sound yields the distances traveled by the sonic signal from the stylus to the microphones. It is then a matter to triangulate and determine the exact origin of the source of the sonic pulse. Methods for determining a location based on the distance traveled by two signals are well-known. Those skilled in the art will envision many approaches for applying the present invention.

SIGNAL PROCESSING CIRCUITRY

Figure 5:
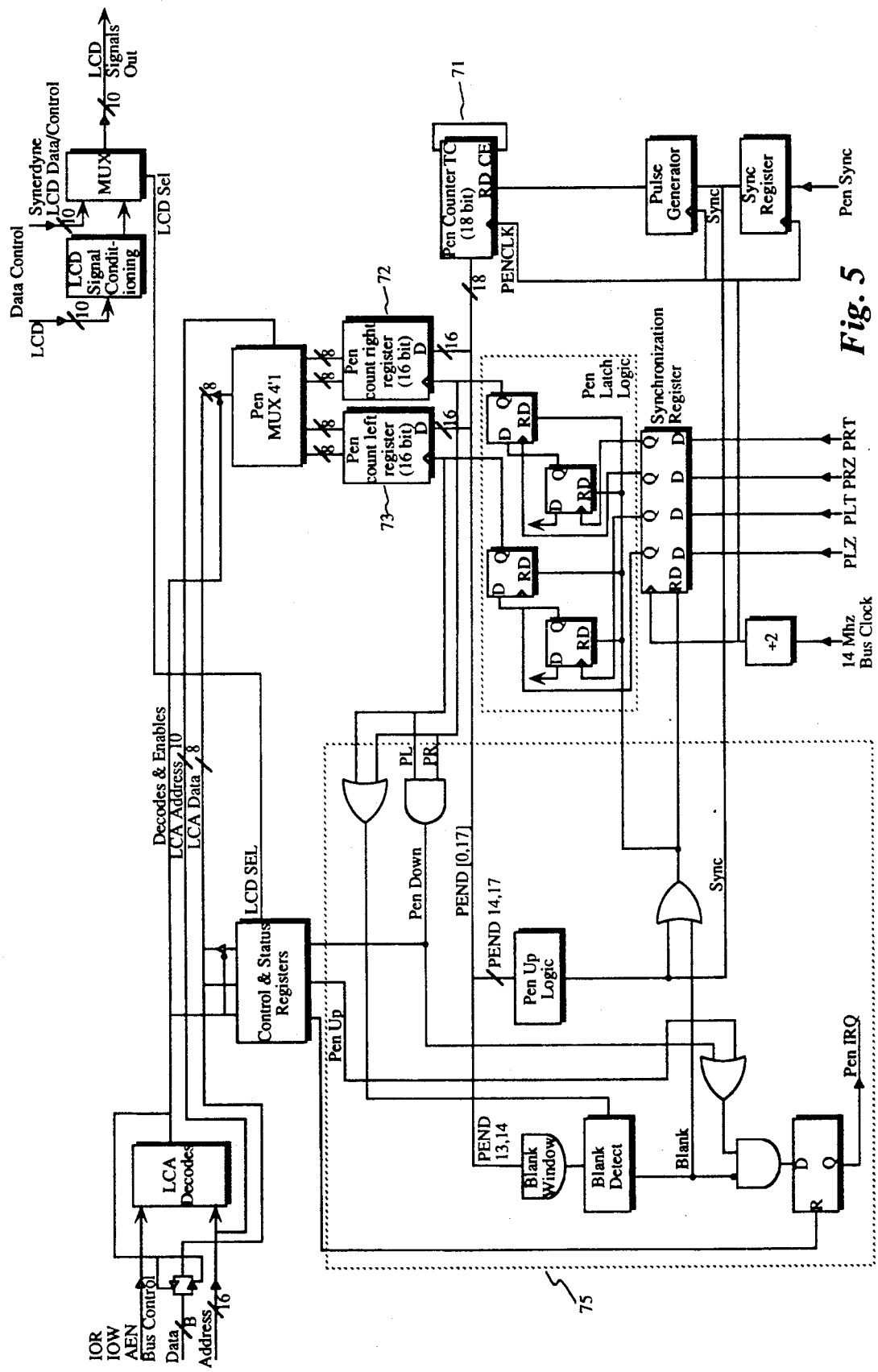
FIG. 5 illustrates a block diagram of the circuitry for processing detected signals for timing the travel and determining the distance of travel from the stylus pen to the detection circuitry in accordance with a preferred embodiment of the present invention.

FIG. 5 illustrates a block diagram of the digital circuitry in accordance with the preferred embodiment of the present invention for processing the synchronization signal and the threshold and zero-crossing detection signals. The signals are all synchronized to a 140 nsec clock. The synchronization signal starts the counter 71 which increments for each period of the 140 nsec clock. The synchronized threshold signals each enable a flip-flop which is then toggled by the zero-crossing signals. The output of these flip-flops then cause the count value of the counter 71 to be latched to either the pen count right register 72 or the pen count left register 73 according to whichever first zero-cross-after-threshold signal has been detected.

The preferred embodiment digital processing circuitry further includes blanking circuitry 75. As described, the magnetic synchronization pulse is issued every 10 milliseconds. Because of the size of the tablet surface and the speed of sound, the ultrasonic signal for the left and right microphones should be detected within one millisecond following the synchronization pulse. Thus, at more than one millisecond after the synchronization pulse, there should be no sonic signals in the desired frequency range until after the next synchronization pulse. It can be presumed that any such sonic disturbance in that frequency range is extraneous noise. Therefore, at a point prior to the succeeding synchronization pulse, perhaps at the 9 millisecond point after the preceding one, a snoop is performed to see if there is any ultrasonic noise. At that point, the threshold level due to the exponentially decaying threshold will be very low and any ultrasonic noise will be easily detected. The blanking circuitry operates to disregard a sonic signal after the next synchronization signal if any sonic levels meet the threshold level prior to the synchronization signal because it can presumed that the information will be distorted or not authentic. When this happens, no pen interrupt is asserted to the host system utilizing the pen input. After a succeeding synchronization signal if no noise is detected, the counts are latched and processed by the circuitry as described previously.

METHOD OF OPERATION

The preferred embodiment of the present invention is utilized in a system in which a 16-bit microprocessor operates and also serves for processing of the signals as well. The present invention may be utilized in a single processing system without a dedicated processor for handling positioning due to some optimized coordinate translations to be described further herein. The processor is interrupt driven such that pen locations are reported to it for each cycle of the pen clock and when the processor is not processing the pen input it is free to continue processing other activities.

Figure 6:
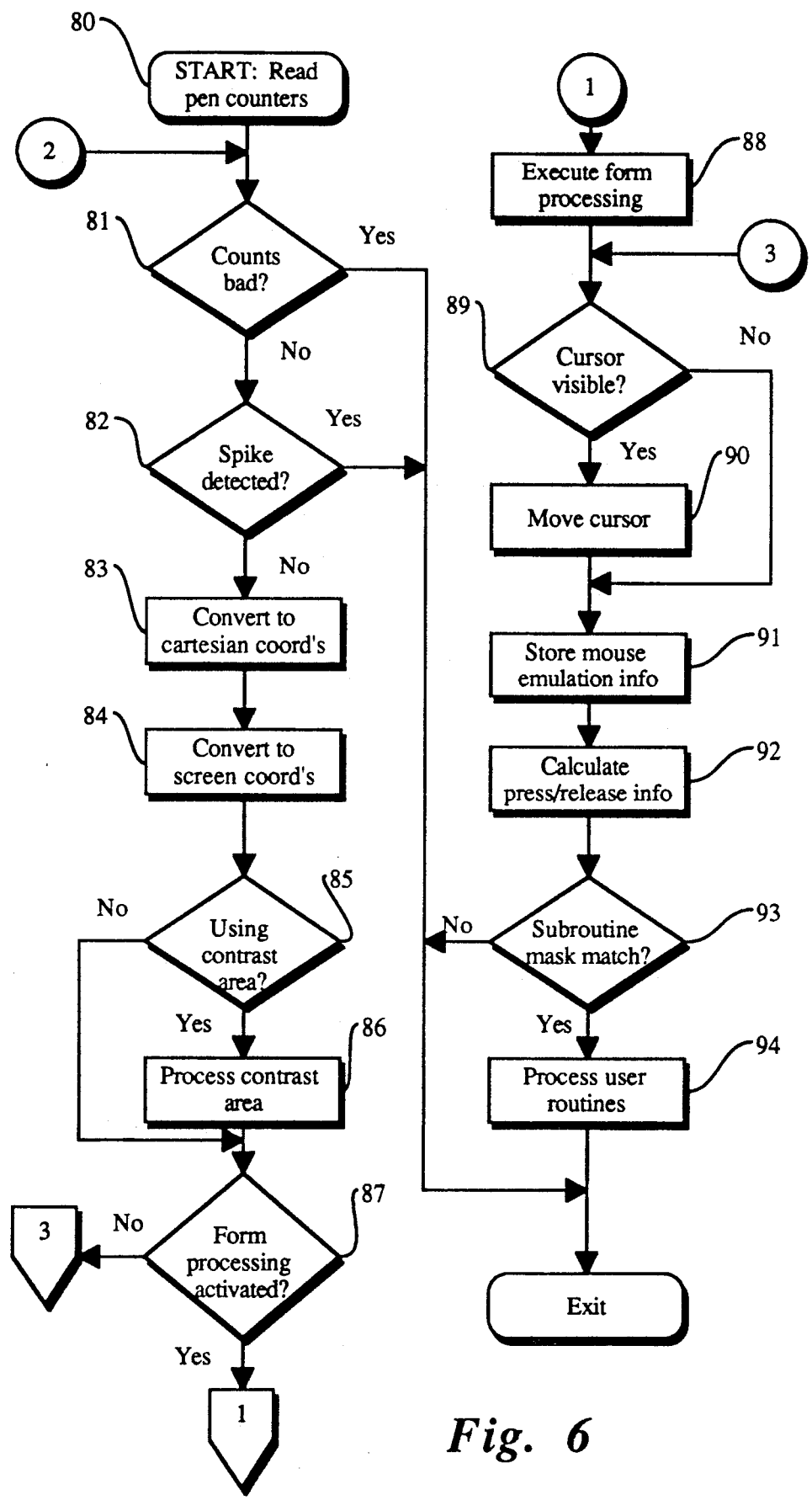
FIG. 6 illustrates a flow chart in accordance with the method of processing interrupts for the present invention.

FIG. 6 illustrates the interrupt processing flow diagram for the present invention for reporting pen locations to the processor of the system in which the present invention is incorporated. The interrupt flow begins at start block 80 where the counter values that have been latched into the pen registers are stream fed to the processor down a bus by multiplexing hardware illustrated in FIG. 5. Next, at decision box 81 it is determined whether or not the counter values are bad. If so, the interrupt routine ends. Bad counts, for example, are those where the counter value is so low that it would not even account for the delays in the circuitry. Likewise, counts which are larger than a value indicating the farthest point on the screen are clearly erroneous and are ignored. Next, at decision block 82, it is determined whether or not the point is a spike point. A spike is usually a single stray coordinate that occurs between two valid coordinates. The amount of deviation allowed for a single point before considering it a spike can be software selected.

In the interrupt processing flow diagram, once it has been determined that the counts are not bad and the point is not a spike, it is necessary to convert the count values in the left and right registers into Cartesian coordinates and then convert those coordinates to screen coordinate. These steps are carried out at blocks 83 and 84 of the routine. Conversion block 83 will be described with more detail further herein with respect to FIG. 7. The conversion to screen coordinates block 84 performs scaling based on the resolution of the output device to be used.

Once the position over the tablet that the pen is pointing to has been determined, it can be determined if the pen is in a special function area, such as in an area defined as the contrast area. The contrast area is a strip or area in one portion of the screen which allows for control of the contrast of the output display. In one embodiment of the present invention, touching this area for one full second results in putting the software into contrast change mode which then alters the contrast of the screen based upon pen movement. Thus, at decision box 85 it is determined whether or not the screen coordinates calculated at block 84 correspond to the contrast area and if they do, then at box 86 contrast processing is carried out. Next, it can determined at decision block 87 whether the system is in a particular type of form processing mode and if it is, the form processing can be carried out at step 88 based on the value of the location of the pen. If the pen is being used for indicating a cursor position at decision block 89, then the cursor can be moved accordingly at block 90. Blocks 91 and 92 are used for mouse emulation purposes when the pen is being used as a standard mouse type pointer. Decision box 93 tests for user defined conditions to be met in order to process user routines and then those routines are processed at block 94. The interrupt then ends and the processor can go back to what it was doing prior to the interrupt.

The routine can optionally include steps for steadying the input. That is, if a series of points occur in the immediate vicinity of the original point, they can be assumed to be the same point. The varying points would not be displayed. This would eliminate small variations around a point caused by hand motion or noise. The routines may also include smoothing steps which provide a moving average of data points to reduce noise and jerkiness in the stylus motion.

METHOD OF CONVERTING TIMING COUNTS TO USEFUL COORDINATES

As described previously, the sonic pen emits a non-audible sound to the microphones. When the pen is detected, the digitizer counters in the hardware start to count up and are individually stopped when the microphones detect the sound that was emitted by the pen. The values from these counters represent distance from the pen to the two microphones. To calculate the corresponding Cartesian coordinates from these counter values, the following formulas are used:

$$X = \frac{R_1^2 - R_2^2 - M_1^2 + M_2^2}{2(M_2 - M_1)}$$

$$Y = \sqrt{|R_1^2 - (X - M_1)^2|}$$

The origin for this Cartesian system is to the left of microphone 12 in the corner of the tablet as shown in FIG. 1. Thus, $M_1$ represents the distance from the origin to the left microphone 12 and $M_2$ represents the distance from the origin to the right microphone 13. $R_1$ is the distance from the stylus to the left microphone 12 and $R_2$ is the distance from the stylus to the right microphone 13. X and Y are the calculated Cartesian distance coordinates corresponding to the point or pixel position on the surface of the screen.

Figure 7:
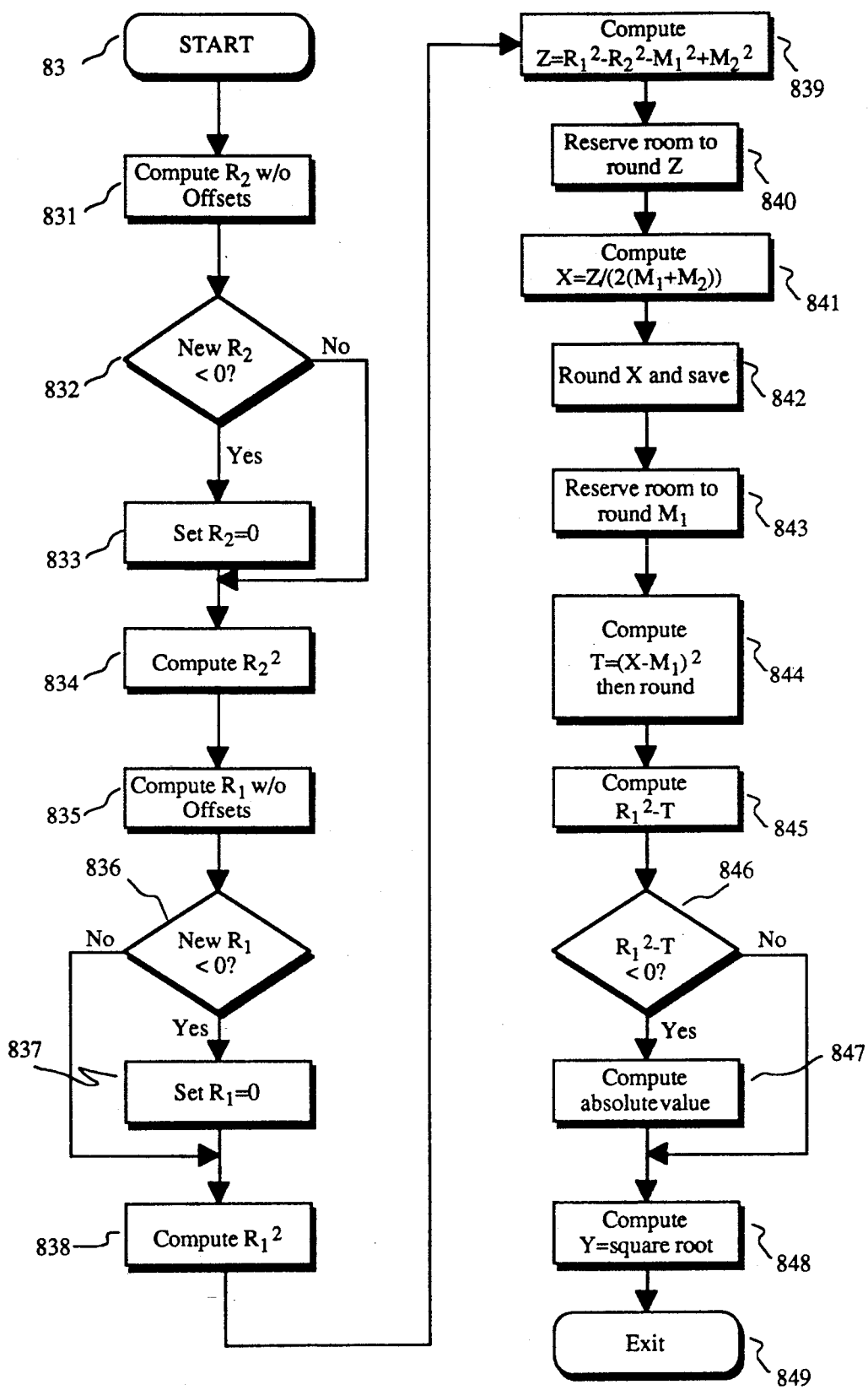
FIG. 7 illustrates a more detailed flow chart for converting from the distances to Cartesian coordinates as utilized in accordance with the preferred embodiment of the present invention.

FIG. 7 illustrates a flow chart showing an efficient method of carrying out this conversion so that no dedicated processor is required for carrying out these calculations 100 times the second. The routine starts at the block 83 as indicated in FIG. 7 which corresponds to the routine 83 of FIG. 6. The first step is to compute the value of $R_2$, subtracting the delay and offset values determined during calibration of the system. $R_2$ is defined as the distance from the stylus to the right microphone. The value of $R_2$ calculated without offsets is the latched count value in the right count register 72 of FIG. 5 minus the number of counts corresponding to the offsets then multiplied by the clocking rate multiplied by the speed of sound. If for some reason the value of $R_2$ is less than zero at decision box 832 then it is set to be equal to zero at step 833. Next, at block 834, the value of $R_2^2$ is calculated. Blocks 835 to 838 of the conversion routine repeat the above process but for calculating the value of $R_1^2$.

Once the values of $R_1^2$ and $R_2^2$ have been determined, block 839 calculates the value of the numerator of the formula for X. The values of $M_1$ and $M_2$ are known because they are parameters that are constant in the system once the product has been manufactured. A temporary variable Z is set to the numerator value for the formula for determining X. At block 840, room is reserved for rounding Z. In the preferred embodiment this refers to shifting the value to the left in the registers so that significant information may be maintained. At block 841, the X value is calculated by dividing the temporary variable Z by the denominator as defined in the formula for X. This value is then rounded and saved at block 842. At block 843, memory is reserved for rounding $M_1$ by shifting it the same amount to the left in the register so that it may be properly manipulated with the X value. Then at step 844, a temporary variable is set to the square of the difference of X and $M_1$ followed by determining the value of $R_1^2$ minus the temporary variable at step 845. This represents the value under the square root and absolute value signs in the formula for determining Y. At decision box 846, if this value is less than zero then at block 847, the absolute is calculated. Finally, at block 848, a square root is performed yielding the Y value. The conversion routine 83 is optimized such that no dedicated processor is required for processing pen inputs.

METHOD OF CALIBRATION

Because very precise measurements are needed in determining sonic pen location over the tablet, it is necessary to be able to calibrate the digitizer. Since the present invention uses sound for locating the pen, unique problems arise which are not encountered in other pen-based computer systems. For example, the speed of sound changes with the temperature in the ambient environment. Other things that must be taken into account in calibrating are the delay times that the circuitry introduces from the sound entering the microphone to the counter stopping. Also, during manufacturing microphones cannot be guaranteed to be in an exact location and adjustments need to be made for each system depending on the eventual location of the microphones.

Figure 8:
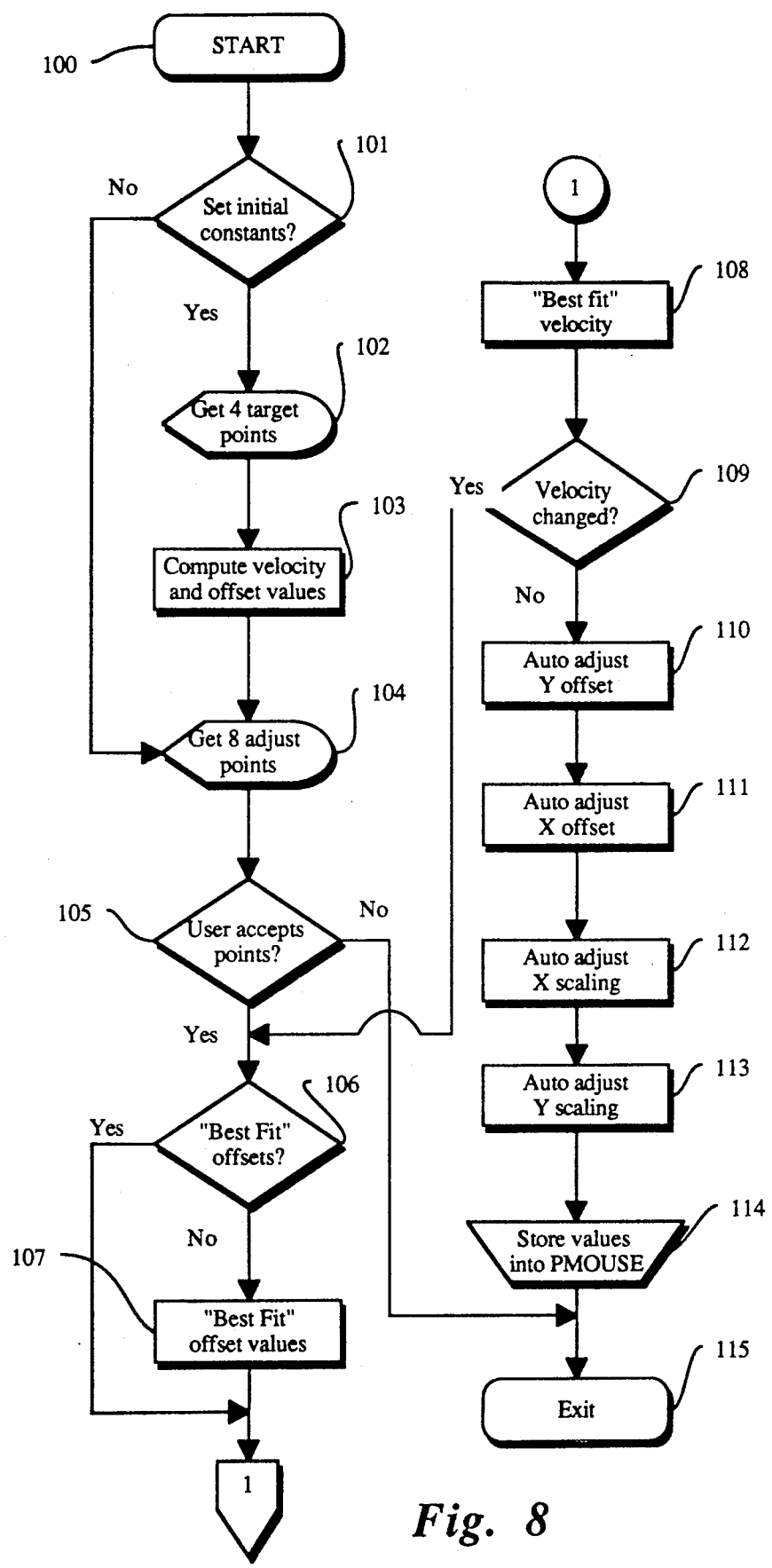
FIG. 8 illustrates a flow chart indicating the method for calibrating a system in accordance with the present invention.

The calibration process is shown in FIG. 8 and begins at start block 100. At decision block 101, it is determined whether or not it is necessary to calculate the speed of sound and the microphone offset delay times. This is a routine that should probably only need to be run once if the machine is going to be used in the same environment thereafter If it is necessary, then at box 102 the user points at four targets that will be displayed on the screen. The four targets are chosen that are known distances from the microphones and from each other so that by comparing times from two different points the speed of sound can be determined as well as the microphone offset delay. The offset delay times are the combination of the time that the sound must travel from the edge of the tablet to the microphone, and then from the microphone through the entire hardware circuitry until the counter recognizes it. Once the four target points are pointed to by the user, step 103 computes the velocity of sound and the offset values. One pair of points will be used to compute the velocity and two offsets for one microphone. The other pair will be used to compute the velocity of sound again and the two offsets for the other microphone. The velocity values will be compared and if they are not close to the same value, they should be rejected and that portion of the routine should be repeated. Likewise, if the offset values are not close they should be rejected. If the values are close, then the average of the two velocity values is used for the speed of sound. Also, the two offsets for each of the microphones are also averaged separately.

Once the velocity of sound and delay times for the circuitry have been determined, it is next necessary to input eight adjustment points to be used in calibrating the system. The system will display eight points at which the user is to place the pen. The points are spread out in such a way as to cover the surface area of the tablet at known positions so that a "best fit" adjustment to the velocity and offset values may be calculated. At decision box 105 it is determined whether or not the adjust points that were entered are correct and accurate and if so, they should be accepted otherwise the procedure should be re-executed. At decision box 106, it is determined if the "best fit" approach for the offsets should be initially used. If it is then at block 107, the "best fit" offset values are calculated. Since the procedure knows where the adjust points were on the display, the procedure will iteratively change the left and right offset values and try to "fit" it to the known locations on the display. The purpose is to cause vertical alignment of the points and to reduce bowing and rounding by "straightening" the line of points. If the resulting output values are close to the two locations, these values will be stored.

The calibration procedure not only seeks the closest fit for all points, but also requires that all of the points be within predefined distances from one another. During the "best fit" procedure the value for the velocity of sound is kept constant. Then, at box 108 a "best fit" velocity value is evaluated. This follows a similar procedure as with the offset values but in this case, the offset values are kept constant while the velocity value is varied until a best fit occurs. If at decision box 109 it is determined that a better fit velocity value has been found then beginning back at step 106, it is necessary to repeat the process and determine if new "best fit" offset values can be determined. That is, if the velocity has been updated, the offsets must be updated again since the offset value computations are based on the velocity. By recursively repeating these procedures a better fit is acquired.

Once the "best fit" procedures have attempted to make the lines straight, the procedure will then try to move the straight line closest to its target by "shifting"

it toward the adjustment points at blocks 110 and 111 for determining a Y offset value and an X offset value. Likewise, at blocks 112 and 113, the X and Y scaling are adjusted to best fit the line. Once all offsets and constants have been evaluated, the values are stored at block 114 and the procedure ends at step 115.

ALTERNATIVE EMBODIMENTS

FIGS. 9(a), 9(b) and 9(c) show several alternative embodiment pen configurations in accordance with the present invention. Each of the alternative embodiments is identical except for the cap end of the pen. The cap portion is where the power source is maintained. The various embodiments shown in FIGS. 9(a), 9(b) and 9(c) may be replaced by one another merely by replacing the cap end of the stylus. The embodiment of 9(a) illustrates one where it is desired to have a tether 120 attaching the stylus to the digitizer pad. Such a tether may provide an alternative synchronization method so that rather than using a synchronization signal, a pulse on the tether wire will start the counter when its sonic pulse is triggered.

The embodiment shown in FIG. 9(b) illustrates a cap which incorporates a rechargeable battery and the embodiment of FIG. 9(c) illustrates a cap capable of housing a disposable AAA battery. Each pen is designed the same with only the cap and power source being different. Another feature that may be incorporated into the system is a pen pocket clip which provides a cut-off switch so that when the pen is inserted into a pocket it cannot be turned on even if the tip is pressed down against the bottom of the pocket.

FIG. 10 illustrates another alternative of embodiment in which an additional sound path 130 is shown coupled to the sound pipe 22. The length of the sound path 130 should be equal to half the wavelength of the ultrasonic sound wave and have approximately the same diameter as the sound pipe 22. The result is to very rapidly quiet sonic pulses because after the initial pulse, the detoured portion of the sound will destructively interfere with the sound traveling down the sound pipe 22 thereby quenching the trailing wavelets of the pulse. Such an advantage would not be available in a spark gap type system of the prior art and so is only available where acoustics are used for pen location.

The present invention need not be limited in application to using only two microphones. While at least two microphones are needed for triangulating in a two-dimensional writing space, more detectors could provide greater precision and accuracy in determining the stylus location. Further, additional microphones can provide the ability to locate a pointer within a three-dimensional work space. The remaining details to such a system could be implemented in much the same way as described above.

Although the present invention has been described in terms of a preferred embodiment, it will be appreciated that various modifications and alterations might be made by those skilled in the art without departing from the spirit and scope of the invention. The invention should, therefore, be measured in terms of the claims which follow.

I claim:

1. A position indicating apparatus for use in an acoustic digitizer system for indicating a location of said position indicating apparatus comprising:

magnetic pulse generating means for emitting magnetic synchronization pulses at predetermined time intervals; and sonic pulse generating means for emitting sonic pulses at said predetermined time intervals, whereby said magnetic synchronization pulses and said sonic pulses are simultaneously emitted at said predetermined time intervals from the location of said position indicating apparatus at said predetermined time intervals.

2. The position indicating apparatus of claim 1 further comprising:

a housing having first and second ends, said housing encasing said magnetic pulse generating means and said sonic pulse generating means;

a power supply coupled to said magnetic pulse generating means and to said sonic pulse generating means;

a sound pipe protruding from said first end of said housing and embraced in said first end of said housing, said sound pipe having interior and exterior ends, said exterior end defining a plurality of apertures through which said sonic pulses are emitted from said housing; and timing means electrically coupled to said power supply, said sonic pulse generating means and said magnetic pulse generating means, said timing means controlling the emission of said sonic pulses and said magnetic synchronization pulses at said predetermined time intervals.

3. The position indicating apparatus of claim 2 wherein said sonic pulse generating means comprises a sonic transducer encased in said housing and responsive to said timing means for generating said sonic signals at said predetermined time intervals, said sonic transducer coupled to the interior end of said sound pipe for propagating said sonic signals down said sound pipe and out of said position indicating apparatus through said apertures defined by said exterior end of said sound pipe.

4. The position indicating apparatus of claim 3 wherein said sonic transducer comprises:

a piezo-ceramic stack having first and second ends and coupled to said power supply and responsive to said timing means, said piezo ceramic stack expanding and contracting responsive to power supplied by said power supply under the timing control of said timing means;

a diaphragm coupled to said first end of said piezo stack and responsive to the expanding and contracting motions of said piezo stack, said diaphragm translating said motions into said sonic pulses, said diaphragm directing said sonic pulses into said sound pipe; and a reaction mass coupled to said second end of said piezo ceramic stack for directing the motions of said ceramic stack in the direction of said diaphragm, whereby the sonic waveform generated by said sonic transducer is characterized by a large first pulse.

5. The position indicating apparatus of claim 4 further comprising a cone plug embedded in said housing near said first end of said housing, said cone plug defining a cone between said interior end of said sound pipe and said diaphragm, said cone having a wide end facing and proximate to said diaphragm and a narrow end facing and proximate to said interior end of said sound pipe, said cone for transmitting said sonic pulses from said diaphragm to said sound pipe.

6. The position indicating apparatus of claim 2 wherein said magnetic pulse generating means comprises a wire coil encased in said housing and responsive to said timing means for generating said magnetic synchronization pulses at said predetermined time intervals, said wire coil defining a central axis substantially parallel to said sound pipe.

7. The position indicating apparatus of claim 5 wherein said magnetic pulse generating means comprises a wire coil encased in said housing and wound around said cone plug, said coil responsive to said timing means for generating said magnetic synchronization pulses at said predetermined time intervals, said coil defining a central axis substantially parallel to said sound pipe.

8. The position indicating apparatus of claim 5 further comprising a switching means coupled to said power supply and to said sound pipe, said sound pipe being embraced by said housing such that it has a recessed position when depressed, said switching means activating said position indicating apparatus when said sound pipe is recessed.

9. The position indicating apparatus of claim 8 wherein said switching means comprises:
 a contact switch affixed to said sound pipe in said housing, said contact switch receding further into said housing when said sound pipe is recessed; and
 a flexible contact encased in said housing and electrically coupled to said power supply, said contact switch and said flexible contact being brought into abutting contact when said sound pipe is recessed thereby closing an electrical circuit which activates said position indicating apparatus and initiates the emission of said sonic pulses and said magnetic synchronization pulses at said predetermined time intervals.

10. The position indicating apparatus of claim 3 further comprising positive and negative driving voltage sources coupled to said power supply, said timing means, and said piezo stack, said timing means controlling said positive and negative driving voltage sources such that a positive voltage of a first magnitude is supplied to said piezo stack, followed by a negative voltage at a second magnitude being supplied to said piezo stack, followed by a positive voltage at approximately said first magnitude being supplied to said piezo stack, said second magnitude being greater than said first magnitude.

11. The position indicating apparatus of claim 2 wherein said defined plurality of apertures have a combined area approximately equal to the cross-sectional area of said sound pipe.

12. The position indicating apparatus of claim 1 wherein said magnetic pulse generating means generates said magnetic synchronization pulses at said predetermined time intervals in such a manner that said magnetic synchronization pulses convey information about said position indicating apparatus.

13. The position indicating apparatus of claim 2 wherein said second end of said housing comprises a replaceable cap end for encasing said power supply.

14. The position indicating apparatus of claim 13 wherein said replaceable cap end further comprises a tether wire for coupling said position indicating apparatus to an external power supply.

15. The position indicating apparatus of claim 2 wherein said sound pipe further comprises a sound path detour means coupled thereto for diverting a portion of the sonic signal to travel an additional distance approximately equal to one-half the wavelength of said sonic pulses, then recombining with the non-diverted portion to cancel any extraneous portion of said sonic pulse generated by said sonic pulse generating means.

16. A position detecting apparatus for use in an acoustic digitizer system comprising:
 magnetic pulse detecting means for detecting magnetic synchronization pulses;
 first sonic pulse detecting means for detecting sonic pulses in a predetermined frequency range at a first detection location; and
 second sonic pulse detecting means for detecting sonic pulses in said predetermined frequency range, said second sonic pulse detecting means detecting said sonic pulses at a second detection location, said first and second detection locations being separated by a predetermined distance.

17. The position detecting apparatus of claim 16 further comprising a detection surface having at least a first edge, said first and second detection locations being proximate to said first edge of said detection surface and separated by said predetermined distance.

18. The position detecting apparatus of claim 17 wherein said magnetic pulse detecting means is a wire loop defined by the perimeter of said detection surface, said wire loop generating a synchronization signal when a magnetic pulse is detected.

19. The position detecting apparatus of claim 18 wherein first and second sonic pulse detecting means comprise:
 first and second microphones for receiving sonic pulses;
 first and second filtering means coupled to said first and second microphones respectively for filtering out sound not within said predetermined frequency range; and
 first and second comparing means coupled to said first and second filtering means respectively for identifying a predetermined point in a waveform defined by said sonic pulses.

20. The position detecting apparatus of claim 19 wherein said first and second comparing means each comprise:
 a threshold comparator for detecting when a sonic pulse has a point in its waveform having a greater magnitude than a predetermined threshold; and
 a zero-cross detector for detecting a subsequent zero-crossing subsequent to detecting a sonic pulse which has a magnitude greater than said predetermined threshold.

21. The position detecting apparatus of claim 20 wherein said subsequent zero-crossing is the first zero-crossing of the waveform following a magnitude at least as large as said threshold.

22. The position detecting apparatus of claim 20 further comprising sensitivity control means for reducing the threshold checked for by the threshold comparators of said first and second comparing means, said sensitivity control means setting the highest threshold when said magnetic synchronization pulse is detected and decreasing said predetermined threshold exponentially over time.

23. The position detecting apparatus of claim 20 further comprising signal distance timing means responsive to said synchronization signal and coupled to said first and second comparing means for timing the difference in time between detecting said magnetic synchronization signal and a corresponding sonic signal detected at said first and second detection locations.

24. The position detecting apparatus of claim 23 wherein said signal distance timing means comprises:
   a clocking means for signaling clock cycles at predetermined clock intervals;
   counting means responsive to said clocking means and said magnetic synchronization signal for counting the number of clock cycles following the detection of said magnetic synchronization signal; and
   first and second memory registers coupled to said counting means and responsive to said first and second comparing means respectively, said first memory register storing the value in said counting means when said first comparing means detects said predetermined point in said waveform defined by said sonic pulse, said second memory register storing the value in said counting means when said second comparing means detects said predetermined point in said waveform defined by said sonic pulse,
whereby said stored counter values correspond to the distance from which said sonic pulse originated to said first and second detection locations.

25. The position detecting apparatus of claim 23 further comprising blanking means coupled to said timing means and said comparing means for determining if sonic signals are detected at an improper time and causing said position detecting apparatus to ignore those sonic signals.

26. The position detecting apparatus of claim 24 further comprising a microprocessor coupled to said first and second memory means for translating said stored counter values into coordinates corresponding to a location over said detection surface.

27. The position detecting apparatus of claim 26 further comprising a thermometer means coupled to said microprocessor for reporting the temperature over said detection surface for correcting said coordinates due to variations in the temperature.

28. The position detecting apparatus of claim 26 wherein said detection surface overlays a display screen coupled to said microprocessor for displaying the output of said microprocessor.

29. An acoustic digitizer system comprising;
   position indicating means for simultaneously generating a magnetic synchronization signal and a sonic location signal, wherein said magnetic synchronization signal propagates at a rate significantly faster than the speed of sound; and
   position detector means having first and second sonic signal detection means and magnetic synchronization signal detection means, wherein said position detector means determines the time difference between the detection of said magnetic synchronization signal and the time when said first and second sonic signal detection means detect said sonic location signal.

30. The acoustic digitizer system of claim 29 wherein said position indicating means comprises:
   power supply means for powering said position indicating means;
   timing means coupled to said power supply means for generating trigger signals;
   magnetic synchronization signal generating means coupled to said timing means for generating said magnetic synchronization signals in response to said trigger signals; and
   sonic signal generating means coupled to said timing means for generating said sonic signals responsive to said trigger signals and simultaneously with the generation of said magnetic synchronization signals.

31. The acoustic digitizer system of claim 30 wherein said sonic signal generating means is a piezoelectric transducer assembly capable of emitting ultrasonic sound waves within a predetermined frequency range.

32. The acoustic digitizer system of claim 30 wherein said magnetic synchronization signal generating means is a wire coil coupled to said power supply means for generating magnetic pulses.

33. The acoustic digitizer system of claim 29 wherein said first and second sonic signal detection means of said position detector means comprises first and second microphones and said magnetic synchronization signal detection means comprises a wire detection coil.

34. The acoustic digitizer system of claim 33 further comprising signal filtering circuitry for filtering out sonic signals not within said predetermined frequency range.

35. The acoustic digitizer system of claim 34 wherein said signal filtering circuitry comprises:
   first and second preamplifiers coupled to said first and second microphones, respectively, for providing high gain and low noise to detected sonic signals;
   first and second filter means coupled to said first and second preamplifiers for filtering out unwanted portions of detected sonic signals; and
   first and second zero-crossing detectors for detecting a first minimum after a first maximum of a filtered signal.

36. The acoustic digitizer system of claim 35 further comprising varying threshold circuitry whereby a minimum detectable threshold can be set and decreased as the time from synchronization signal detection passes.

37. The acoustic digitizer system of claim 36 wherein said varying threshold circuitry provides for an exponentially decaying qualifying threshold.

38. The acoustic digitizer system of claim 35 further comprising distance timing means for timing the time period between the detection of said magnetic synchronization signal and the detection of said sonic signals at said first and second microphones.

39. The acoustic digitizer system of claim 38 wherein said distance timing means comprises:
   a clocking means for signaling clock cycles at predetermined clock intervals;
   counting means responsive to said clocking means and said magnetic synchronization signal for counting the number of clock cycles following the detection of said magnetic synchronization signal; and
   first and second memory registers coupled to said counting means and responsive to said signal filtering circuitry, said first memory register storing the value of said counting means when said first microphone detects said sonic pulse, said second memory register storing the value of said counting means when said second microphone detects said sonic pulse.

40. A method of acoustically digitizing data input comprising the steps of:

emitting a magnetic synchronization pulse at a desired location over a detection tablet;

emitting a sonic location signal simultaneously with said magnetic synchronization;

detecting the magnetic synchronization pulse;

starting a counter which increments at a predetermined frequency;

storing the value of said counter in a first memory register when said conic location signal is detected at a first detection location; and storing the value of said counter in a second memory register when said sonic location signal is detected at a second detection location.

41. The method of claim 40 further comprising the steps of:

translating the stored counter values to distances from said desired location to said first and second detection locations;

translating the distances to Cartesian coordinate values for said desired location; and translating the Cartesian coordinate values to display screen location values.

42. The method of claim 41 wherein said step of translating the counter values to distances comprises the steps of:

subtracting from the stored count values the number of counts known to be caused by inherent delays in the system;

multiplying the counts in both memory registers by the predetermined frequency at which said counter increments; and multiplying the results by the speed of sound for the ambient environment.

43. The method of claim 42 wherein said step of translating the distances to Cartesian coordinate values comprises the steps of:

calculating the X value based on the following formula:

$$X = \frac{R_1^2 - R_2^2 - M_1^2 + M_2^2}{2(M_2 - M_1)}$$

calculating the Y value based on the following formula:

$$Y = \sqrt{|R_1^2 - (X - M_1)^2|}$$

wherein $R_1$ equals the distance from said desired location to said first detection location, $R_2$ equals the distance from said desired location to said second detection location, $M_1$ equals the distance from said first detection location to the coordinate origin of said Cartesian coordinate system, and $M_2$ equals the distance from said second detection location to the origin of said Cartesian coordinate system.

44. The method of claim 43 wherein said step of translating the Cartesian coordinate values to display screen location values comprises the step of applying scaling to the coordinate system values based on the resolution of said output display screen.

45. The method of claim 41 further comprising the step of calibrating the acoustic digitizer system to account for the ambient speed of sound and delays in the processing hardware.

46. The method of claim 45 wherein said step of calibrating comprises the steps of:

emitting a sonic location signal from four predetermined target points;

determining the time of travel from said target points to said first and second detection locations for two pairs of said target values; and using a known separation of the target points for determining the time of travel difference thereby yielding the speed of sound for the ambient environment.

47. The method of claim 46 wherein said calibrating step further comprises the steps of:

emitting sonic location signals from eight predetermined points;

recursively testing different constants for the speed of sound to establish a "best fit" velocity; and recursively testing different offset values for determining a "best fit" delay constant values.

48. The method of claim 40 further comprising the steps of:

detecting for sonic signals prior to the emission of said magnetic synchronization pulse to determine if extraneous noise is present; and ignoring the next sonic location signal if such noise is present.

49. The method of claim 40 further comprising the step of ignoring spike values.

50. The method of claim 40 further comprising the step of smoothing by using a moving average of data points to reduce noise and jerkiness in the motion of the source of said sonic location signal.

51. The method of claim 40 further comprising the step of steadying data points by ignoring data points in an immediate vicinity of a previous data point.

* * * * *

UNITED STATES PATENT AND TRADEMARK OFFICE
CERTIFICATE OF CORRECTION

PATENT NO. : 5,308,936
DATED : May 3, 1994
INVENTOR(S) : Wright

It is certified that error appears in the above-identified patent and that said Letters Patent is hereby corrected as shown below:

In column 19, at line 9 change "conic" to -- sonic --

Signed and Sealed this

Eleventh Day of April, 1995

*Attest:*

BRUCE LEHMAN

*Attesting Officer*  *Commissioner of Patents and Trademarks*